(12) United States Patent
Wada et al.

(10) Patent No.: US 9,028,179 B2
(45) Date of Patent: May 12, 2015

(54) DRILLING TOOL

(75) Inventors: Kengo Wada, Iwaki (JP); Koji Nisikawa, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 832 days.

(21) Appl. No.: 13/300,423

(22) Filed: Nov. 18, 2011

(65) Prior Publication Data

US 2012/0063860 A1  Mar. 15, 2012

Related U.S. Application Data

(63) Continuation of application No. PCT/JP2010/059542, filed on Jun. 4, 2010.

(30) Foreign Application Priority Data

Jun. 11, 2009  (JP) .................................. 2009-140447

(51) Int. Cl.
  *B23B 51/02*  (2006.01)
  *B23B 51/00*  (2006.01)

(52) U.S. Cl.
  CPC ........... *B23B 51/00* (2013.01); *Y10T 408/9095* (2015.01); *B23B 2251/085* (2013.01);
  (Continued)

(58) Field of Classification Search
  CPC B23B 2251/48; B23B 51/02; B23B 2251/08; B23B 2251/085; B23B 2251/087; B23B 2251/285; B23B 2251/40; B23B 2251/404; B23B 2251/406; Y10T 408/9097; Y10T 408/909; Y10T 408/905
  USPC .......................... 408/223–225, 227, 229, 230

IPC .................................. B23B 51/00,51/02, 51/08
See application file for complete search history.

(56) References Cited

U.S. PATENT DOCUMENTS 867,639 A * 10/1907 Bragg ........................... 408/223
1,407,546 A *  2/1922 Joseph ......................... 408/223
(Continued)

FOREIGN PATENT DOCUMENTS

JP  S50-14097  2/1975
JP  S52-81789  7/1977
(Continued)

OTHER PUBLICATIONS

International Preliminary Examination Report dated Dec. 22, 2012 with English translation of IPRP issued in counterpart PCT Application No. PCT/JP2010/059542.
(Continued)

*Primary Examiner* — Daniel Howell
(74) *Attorney, Agent, or Firm* — Womble Carlyle

(57) ABSTRACT

Chips are segmented to have a desired width and the chip controllability is improved and the tool rigidity is improved. A drilling tool is provided that includes: a tool body; a chip discharge groove formed at the outer periphery of the tool body; at least one sub-groove formed at an inner face facing the front side in the tool rotation direction T of the chip discharge groove; a rake face; a tip end flank face; and a cutting edge formed at a ridge line at which the tip end flank face intersects with the rake face. The plurality of rake faces form a step-like shape having at least one step section. The drilling tool is configured so that the turnup section of the sub-groove is turned up in a different direction from the direction along which the turnup section of the chip discharge groove is turned up.

21 Claims, 11 Drawing Sheets

(52) U.S. Cl.
CPC ....... *B23B2251/14* (2013.01); *B23B 2251/244* (2013.01); *B23B 2251/404* (2013.01); *B23B 2251/406* (2013.01)

(56) References Cited

U.S. PATENT DOCUMENTS

| | | | | |
|---|---|---|---|---|
| 2,201,159 | A | * 5/1940 | Clow | 175/394 |
| 2,646,701 | A | * 7/1953 | Letien | 408/56 |
| 4,080,093 | A | * 3/1978 | Maier | 408/230 |
| 5,160,232 | A | * 11/1992 | Maier | 408/223 |
| 5,957,631 | A | 9/1999 | Hecht | |
| 6,213,692 | B1 | * 4/2001 | Guehring et al. | 408/144 |

FOREIGN PATENT DOCUMENTS

| | | | |
|---|---|---|---|
| JP | S60-74904 | | 5/1985 |
| JP | S64-42815 | | 3/1989 |
| JP | 03196908 | A * | 8/1991 |
| JP | 06-91418 | | 4/1994 |
| JP | 08323541 | A * | 12/1996 |
| JP | 10029107 | A * | 2/1998 |
| JP | 2007-050477 | | 3/2007 |
| JP | 2009101460 | A * | 5/2009 |
| JP | 2009-202288 | | 9/2009 |
| JP | 5413888 | B2 | 2/2014 |
| SU | 517411 | A1 | 6/1976 |
| SU | 663501 | A | 5/1979 |

OTHER PUBLICATIONS

Notice of Allowance dated Mar. 11, 2013 issued in Russian counterpart application (No. 2011150265) with English translation.
International Search Report in PCT/JP2010/059542, dated Aug. 10, 2010.

* cited by examiner

DRILLING TOOL

CROSS-REFERENCE TO RELATED APPLICATIONS

This is a Continuation of International Patent Application No. PCT/JP2010/059542 filed Jun. 4, 2010, which published as WO 2010/143595A1 on Dec. 16, 2010 and claims priority to Japanese Patent Application No. 2009-140447, filed Jun. 11, 2009. The contents of the aforementioned applications are incorporated by reference in their entirety.

BACKGROUND OF THE INVENTION

1. Field of the Invention

The present invention relates to a drilling tool.

2. Description of the Related Art

In recent years, in the case where a workpiece having a complicated shape such as an automobile engine member, etc. is subjected to a drilling machining, chips caused in the machining have been strongly required to be more minute from the viewpoint of improving the chip controllability.

In order to satisfy this requirement, a nicked drill has been known in which a nick for dividing chips is provided by cutting a part of the drill tip end along a flank face (for example, refer to Japanese Patent Laid-Open No. 2007-50477).

This nicked drill is configured so that each of a plurality of cutting edges has a plurality of concave groove-like nicks vertical to the cutting edge. These nicks are arranged in the cutting edges so that the rotation trajectories of the nicks in the circumferential direction around the axis line are different with respect to the cutting edges adjacent to one another, and thereby the nicks divide chips in the width direction within a short range of each nick.

However, in the case of the invention of Japanese Patent Laid-Open No. 2007-50477, nicks provided from the cutting edge along the flank face causes a possibility where a cutting edge at the drill tip end may be grinded together with the nick periphery to thereby eliminate the existence of the nick. Thus, a disadvantage has been caused where the nick function must be maintained by forming, prior to the use of the drill, the nicks of the drill repeatedly by a grinding machining. If the nicks are formed in an extended manner in the vertical direction to the cutting edge in order to avoid the repeated machining of the drill for forming the nicks as described above, a disadvantage of deteriorated cutting edge strength is caused.

Furthermore, the nicks arranged so that a rotational trajectory of the nicks are dislocated with respect to the cutting edges adjacent to one another in the circumferential direction around the axis line. Thus, the nicks are prevented from having a freely-set groove width, position, or number, and thus causing limitation on the width of chips that can be divided.

Furthermore, the invention of Japanese Patent Laid-Open No. 2007-50477 is also disadvantageous in that the invention of Japanese Patent Laid-Open No. 2007-50477 cannot be applied to a one-blade rotation tool because of the configuration where the chip of the residual stock after forming of a machined hole by the nicks cut by a preceding cutting edge in the drill rotation direction is cut by a subsequent cutting edge having a dislocated nick rotation trajectory.

Thus, in order to solve the above disadvantages, the applicant of this application has suggested, in Japanese Patent Laid-Open No. 2009-202288, a method of providing more minute chips according to which a rake face is formed to have a step-like shape having at least one step section so that the cutting edge is divided in the diameter direction of the tool body. The drilling tool as described above does not need to perform the machining for forming nicks that is repeatedly performed in order to polish the cutting edge. This drilling tool can change the number of the step sections or the width in the diameter direction for example to adjust the lengths of the respective divided cutting edges in the diameter direction. Thus, chips can be segmented to have a desired width. This drilling tool also can be applied to a one-blade gun drill or a reamer for example.

However, when the rake face is formed to have a step-like shape as described above, many parts are required to form grooves for discharging chips, which causes a concern that the tool may have a declined rigidity when the tool is used for a deep hole machining drill.

SUMMARY OF THE INVENTION

The present invention has been made in view of the above-described circumstance. It is an objective of the present invention to provide a rotation tool having superior chip controllability and tool rigidity by which chips can be segmented to have a desired width.

In order to solve the above disadvantages, the present invention uses the following means.

The present invention provides a drilling tool that includes: a tool body having an outer shape having a substantially cylindrical shape rotated around an axis line; a chip discharge groove formed in an outer periphery of the tool body to extend from a tip end face of the tool body to a rear end side; at least one sub-groove that is formed at an inner face facing a front side in a tool rotation direction of the chip discharge groove and that are formed to extend from a tip end face of the tool body to a rear end side; a rake face formed at an inner face facing the front side in the tool rotation direction of the chip discharge groove and the at least one sub-groove, respectively; a tip end flank face formed at a tip end face of the tool body; and a cutting edge formed at a ridge line at which the tip end flank face intersects with the rake face. The inner face facing the front side in the tool rotation direction of the chip discharge groove is formed by the rake face to have a step-like shape having at least one step section. A turnup section at the rear end side of the sub-groove is turned up in a different direction from the direction along which the rear end side of the chip discharge groove is turned up.

According to the present invention, the drilling tool has a plurality of rake faces and the plurality of rake faces form a step-like step section. Cutting edges provided at the ridge line of the edges of the respective rake faces are discontinuously arranged in a step-like manner and spaced in the front-and-rear direction of the tool rotation direction.

Thus, chips are segmented to have a narrow width, thus improving the chip controllability.

Furthermore, the number of the sub-grooves or the width for example can be appropriately selected to thereby allowing, without being limited by the design, the respective cutting edges to have a desired length in the diameter direction. Therefore, chips can be segmented to have a desired width.

Furthermore, in contrast with a conventional nicked drill, no bothersome operation is required to repeatedly machine to form nicks whenever the cutting edges are grinded. The rake face shape and the chip discharge groove shape of the present invention also can be applied to a one-blade gun drill or a reamer to segment chips.

Also according to the present invention, the turnup section of the sub-groove is turned up in a different direction from that along which the turnup section of the chip discharge groove is turned up. Thus, even when the chip discharge groove and the sub-groove are formed to have substantially the same length and the respective turnup sections are arranged at substantially the same positions in the axis line direction, there is no risk where chips generated through a cutting operation may be clogged at the turnup sections of the sub-grooves. Thus, the tool can be prevented from having a defect due to sandwiched chips.

In the above invention, the turnup section of the chip discharge groove may be gradually turned up along an inner face facing the front side in the tool rotation direction in a direction from the center side of the tool body to the outer periphery side.

By the configuration as described above, the turnup section of the chip discharge groove is turned up in the same direction as that of the turnup section of the chip discharge groove of a general-purpose drill and thus can be machined in a conventional manner. In this case, the turnup section of the sub-groove is not turned up along the inner face facing the front side in the tool rotation direction of the chip discharge groove in a direction from the center side of the tool body toward the outer periphery side but is turned up in a different direction from the above direction. Thus, chips reaching the turnup section of the sub-groove will be pushed out, at the turnup section of the sub-groove, toward the outer periphery side of the tool body in a different direction from that of the turnup section of the chip discharge groove. Thus, there is no risk where chips may be sandwiched in a narrow space between the turnup section of the sub-groove and the workpiece.

Furthermore, in the above invention, the turnup section of the sub-groove may be gradually turned up in a direction substantially vertical to the inner face facing the front side in the tool rotation direction of the sub-groove, as a position progresses in a direction from the tip end side to the rear end side.

By the configuration as described above, in case that chips reaches the turnup section of the sub-groove, chips will be pushed out to the interior of the chip discharge groove. Thus, chips are prevented from clogging the turnup section of the sub-groove and are stored in the chip discharge groove and are discharged smoothly, thus providing a superior chip discharge property.

Furthermore, in the above invention, the sub-groove may have a shorter length than a length of the chip discharge groove.

By the configuration as described above, when compared with a case where the sub-groove has substantially the same length as that of the chip discharge groove, the tool body has an increased thickness at the rear end side, thus providing improved tool rigidity. Thus, even the tool is used in a long tool such as a gun drill used for a deep hole machining, a sufficient tool rigidity is secured, thus suppressing chatter vibration or a broken tool. Furthermore, the tool body can be manufactured with a shorter time than in the case where the sub-groove has substantially the same length as that of the chip discharge groove.

Furthermore, in the above invention, the tool body may have a back tapered structure in which an outer diameter is gradually reduced from the tip end side to the rear end side and a web at the rear end side of the tool body may have a thickness equal to or higher than a thickness of a web thickness of the tool body.

Furthermore, in the above invention, the tool body may have a web tapered structure in which the web has a thickness gradually increased from the tip end side toward the rear end side.

By the configuration as described above, the tool rigidity can be improved when compared with a general back taper drill in which the web has a thickness corresponding to the back taper to be gradually reduced from the tip end side toward the rear end side.

Furthermore, the web may have substantially the same thickness from the tip end side of the tool body toward the rear end side.

By the configuration as described above, the chip discharge groove can have an increased cross-sectional area, thus improving the chip discharge property.

According to the rotation tool of the present invention, chips can be segmented to have a desired width, thus providing superior chip controllability and tool rigidity.

BRIEF DESCRIPTION OF THE DRAWINGS

Further features of the present invention will become apparent from the following description of exemplary embodiments (with reference to the attached drawings).

DETAILED DESCRIPTION

The following section will describe one embodiment of a drilling tool according to the present invention with reference to FIG. 1 to FIG. 6.

Figure 1:
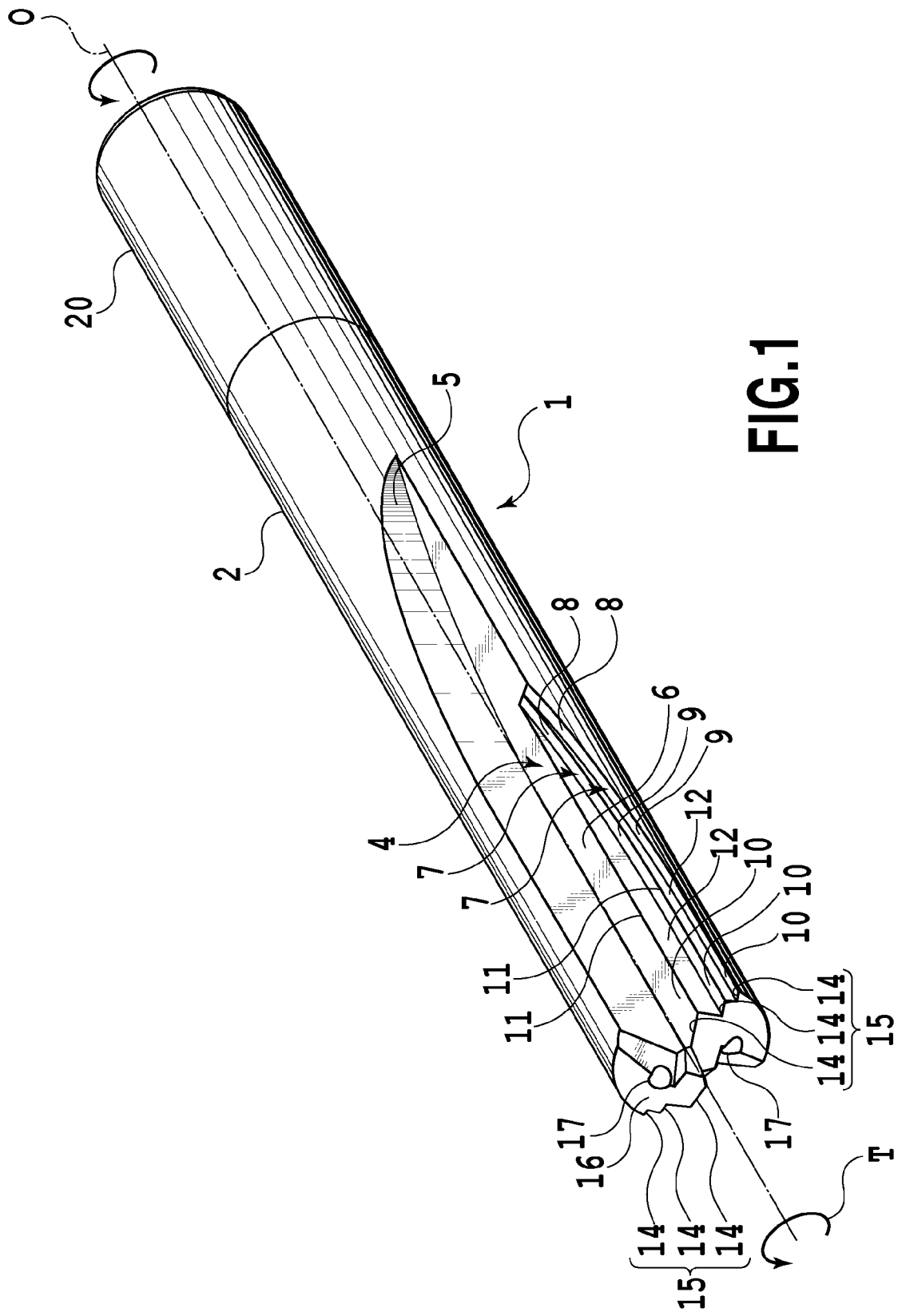
FIG. 1 is a perspective view illustrating a drilling tool according to one embodiment of the present invention.

A drilling tool 1 according to the present embodiment has a shape as shown in FIG. 1 in which an outer diameter has a substantially round bar-like shape. The drilling tool 1 includes: a tool body 2 that has a blade section and that functions as a basic section of the drilling tool 1; and a shank 20 that is integrally formed at the rear end of the tool body 2 and that functions as a tool shaft.

The tool body 2 is formed by cemented carbide, cermet, ceramic, or ultrahigh pressure sintered body for example. As shown in FIG. 1 to FIG. 4, the tool body 2 has a substantially cylindrical shape in the outer diameter direction rotated around the axis line O. This tool body 2 has: a chip discharge groove 4 that is formed at the outer periphery to extend from the tip end face to the rear end side; a tip end flank face 16 formed at a tip end face; and an oil hole 17 that is drilled in the interior and that is used to discharge cutting fluid.

Figure 6:
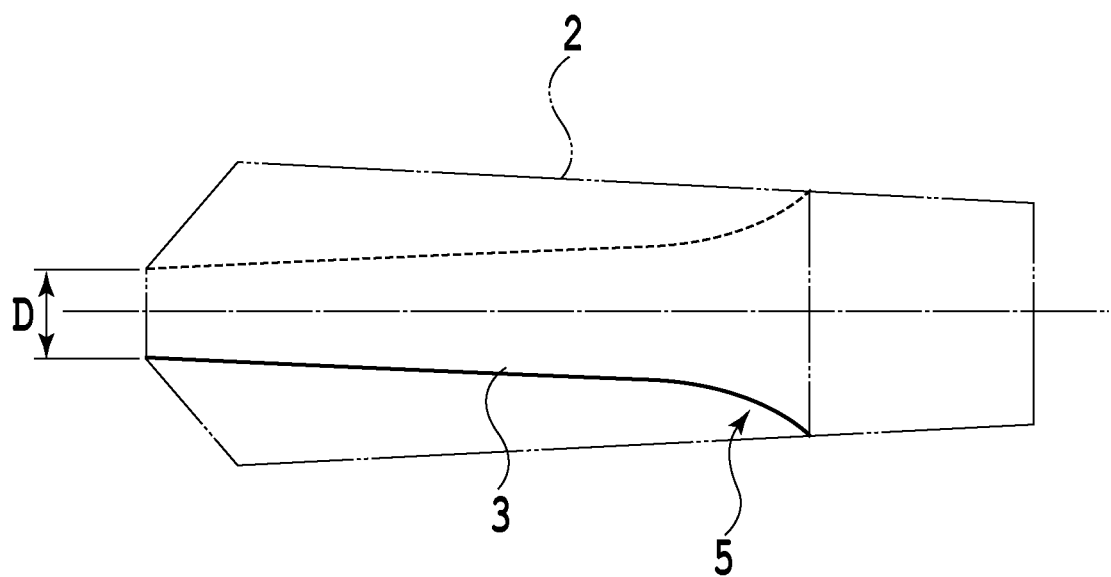
FIG. 6 is a schematic view illustrating the web of the drilling tool of FIG. 1.

This tool body 2 has a cutting part tip end having an outer diameter size (i.e., diameter of the tool body 2) of 6.0 mm for example. This tool body 2 has a back tapered shape in which the outer diameter is gradually reduced from the tip end side toward the rear end side (see FIG. 6). In FIG. 6, the tapered shape of the tool body 2 is shown in an exaggerated manner for a description purpose. The back taper amount of the tool body 2 is set to 0.04/100 or more and 0.06/100 or less and is set to 0.05/100 for example. As shown in FIG. 6, in a part of the tool body 2 having a thick thickness (i.e., web 3), a web taper along which the web 3 has a thickness gradually increased from the tip end side toward the rear end side is provided. The web 3 is formed between parts formed by the groove bottom of the chip discharge groove 4 and the sub-groove 7 that are formed to have 180-degree-rotationally-symmetrical shape to the axis line O of the tool body 2. The thickness of the web 3 at the tip end of the tool body 2 (i.e., web thickness D) is set to 20% or more and 50% or less of the diameter of the tool body 2 and is set to 35% of the diameter of the tool body 2 for example. The web taper amount of the tool body 2 is set so as to secure the rigidity of the tool body 2 and is set to 0.01/100 or more and 0.50/100 or less and is preferably set to 0.05/100 or more and 0.10/100 or less (for example, is set to 0.05/100).

Figure 2:
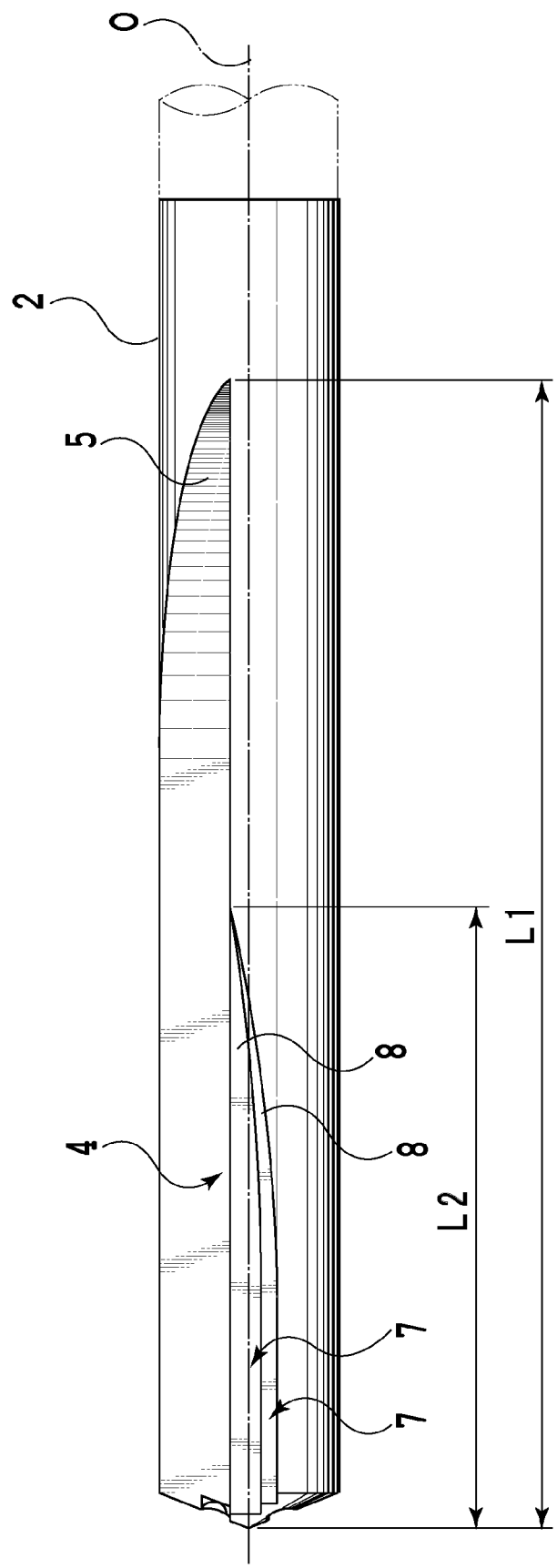
FIG. 2 is a front view illustrating the tool body of the drilling tool of FIG. 1.
Figure 3:
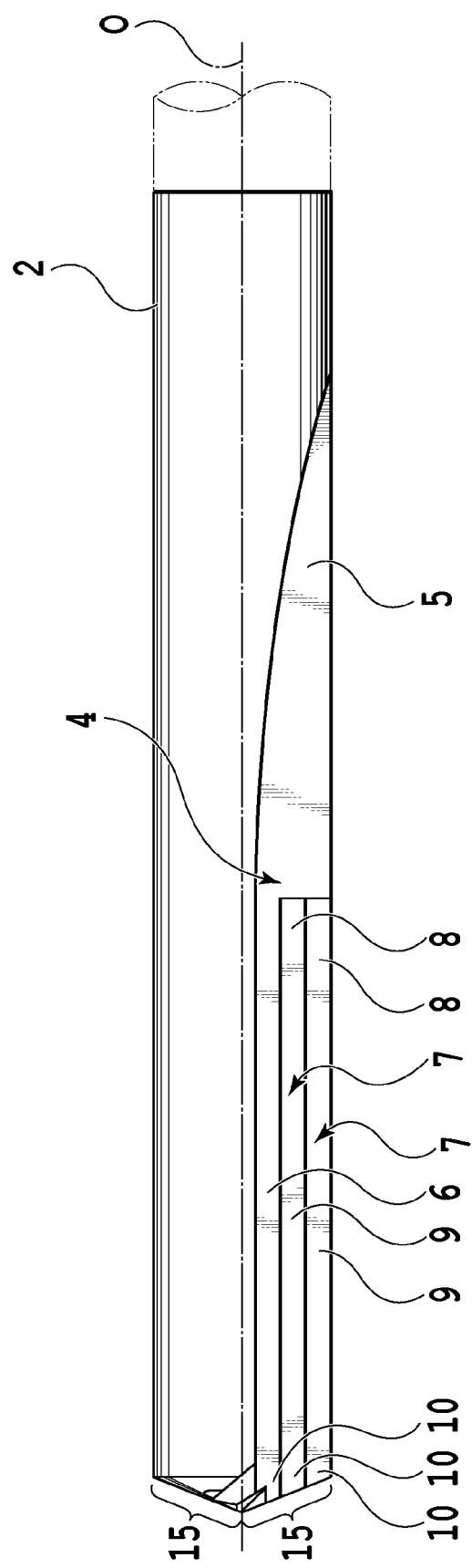
FIG. 3 is a plan view illustrating the tool body of the drilling tool of FIG. 1.

As shown in FIG. 1 to FIG. 3, the chip discharge groove 4 is composed of a straight groove that extends to draw a straight line to be substantially parallel to the axis line O. The chip discharge groove 4 is formed, in the vicinity of the tip end of the tool body 2, to have an arc-like cross section having center angle of about 90 degrees. Among the inner face forming the chip discharge groove 4, the inner face formed at the front side in the tool rotation direction T is formed so as to be gradually turn up in the substantially vertical direction to the inner face formed at the front side in the tool rotation direction T in a direction from the center side of the tool body 2 to the outer periphery side, as a position progresses from the tip end side of the tool body 2 to the rear end side, at a position having a fixed length from the tip end. A part corresponding to the turnup of the tool when this chip discharge groove 4 is machined (i.e., the turnup section 5 of the chip discharge groove 4) is formed so as to be turned up along the inner face 6 facing the front side of the tool rotation direction T of the chip discharge groove 4 in a direction from the center side of the tool body 2 toward the outer periphery side. At the outer side of the tool diameter direction of the inner face 6 facing the front side of the tool rotation direction T of the chip discharge groove 4, two sub-grooves 7 are formed so as to extend from the tip end side to the rear end side. Rake faces 10 are formed at the tip end side of the inner face 6 of the chip discharge groove 4, in the vicinity of the sub-grooves 7, arranged at the inner side in the tool diameter direction of the sub-grooves 7

As shown in FIG. 1 to FIG. 3, the sub-grooves 7 are formed so as to extend in a straight manner to be substantially parallel to the axis line O until a fixed length is reached from the tip end. A part corresponding to the turnup of the tool for machining the sub-grooves 7 (i.e., the turnup sections 8 of the sub-grooves 7) are turned up in a different direction from the direction along which the turnup section 5 in the chip discharge groove 4 is turned up. Specifically, the turnup section 5 of the chip discharge groove 4 is turned up from the center side of the tool body to the outer periphery side along the inner face facing the front side of the tool rotation direction in a direction from the tip end side to the rear end side. In contrast, the turnup section 8 of the sub-groove 7 is gradually turned up in a substantially-vertical direction to the inner face 9 facing the front side in the tool rotation direction T of the sub-groove 7.

The rake face 10 is also formed at the tip end side of the inner face 9 facing the front side in the tool rotation direction T of the sub-groove 7. Two sub-grooves 7 having a configuration as described above are provided to one chip discharge groove 4. Two sub-grooves 7 provided in one chip discharge groove 4 and two sub-grooves 7 provided in another chip discharge groove 4 are provided at 180 degree rotationally-symmetrical positions to the axis line O. In the present embodiment, two sub-grooves 7 are provided in the chip discharge groove 4. However, the present invention is not limited to this. Thus, one sub-groove 7 also may be formed in the chip discharge groove 4 or three or more sub-grooves 7 also may be formed in the chip discharge groove 4.

All of these sub-grooves 7 have lengths L2 that are measured in a direction parallel to the axis line O and that are substantially equal. When the tool body 2 is seen from the front side in a direction orthogonal to the axis line O, the respective sub-grooves 7 have the turnup sections 8 arranged at substantially the same positions. The respective sub-grooves 7 have the length L2 that is shorter than the length L1 of the chip discharge groove so that the turnup sections 8 of the respective sub-grooves 7 are positioned closer to the tip end than the turnup section 5 of the chip discharge groove 4. The sub-groove 7 has the length L2 that is equal to or higher than 20% and lower than 100% of the length L1 of the chip discharge groove 4 and that is preferably 40% or more and 60% or less of the length L1 of the chip discharge groove 4 and that is set to 50% of the length L1 of the chip discharge groove 4 for example.

The respective sub-grooves 7 have the widths W in the tool diameter direction that are substantially equal so that the width of one chip discharge groove 4 in the tool diameter direction is equally divided to three parts by two sub-grooves 7 provided in the chip discharge groove 4. Specifically, the sub-groove 7 has the width W set to be 0.2 mm or more and 4.0 mm or less and is preferably set to 0.4 mm or more and 2.0 mm or less and is set to 0.6 mm for example.

Figure 4:
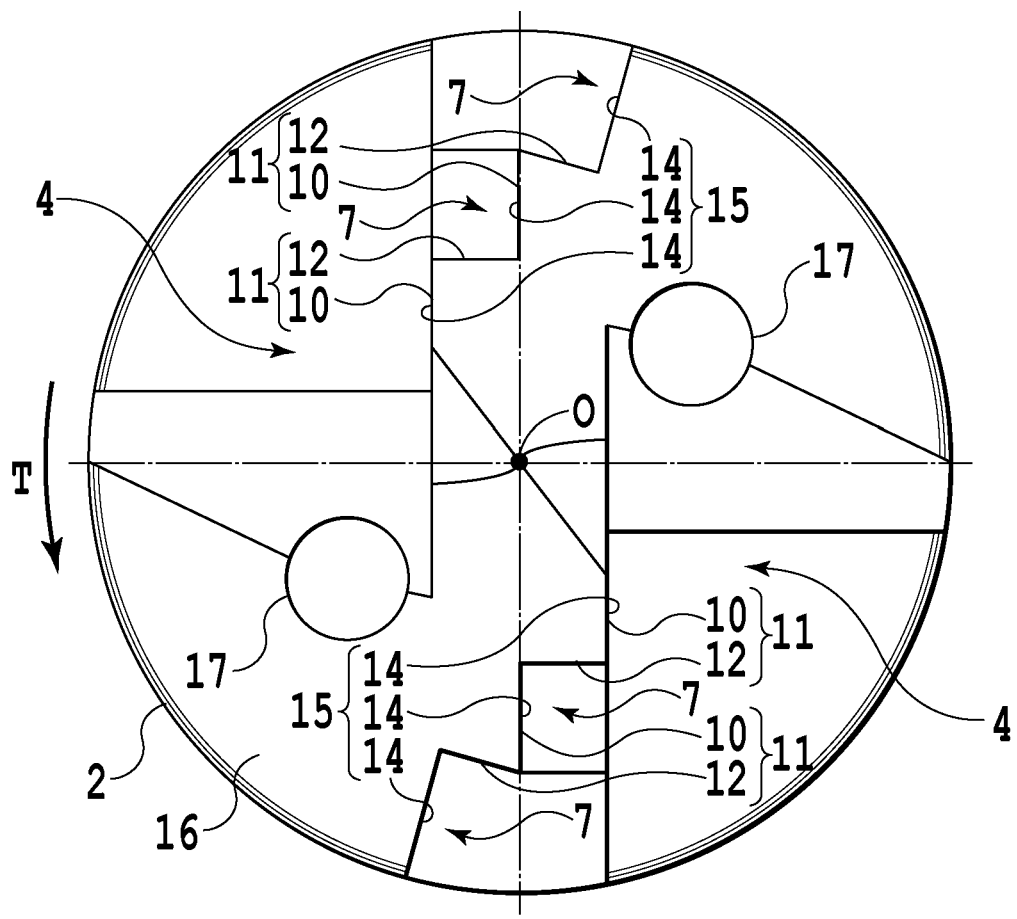
FIG. 4 is a side view illustrating the drilling tool shown in FIG. 1.

As shown in FIG. 4, the rake face 10 is configured so that the rake face 10 formed in the chip discharge groove 4 and the rake faces 10 formed in the respective two sub-grooves 7 are arranged, as a result of that the three rake faces are arranged to have an interval thereamong in the front-and-rear direction of the tool rotation direction T in a step-like manner to thereby form two step sections 11. Each rake face 10 has a substantially-equal width in the tool diameter direction that is set to 0.2 mm or more and 4.0 mm or less corresponding to the width W of the sub-groove 7 and that is preferably set to 0.4 mm or more and 2.0 mm or less corresponding to the width W of the sub-groove 7 and that is set to 0.6 mm for example.

Figure 5:
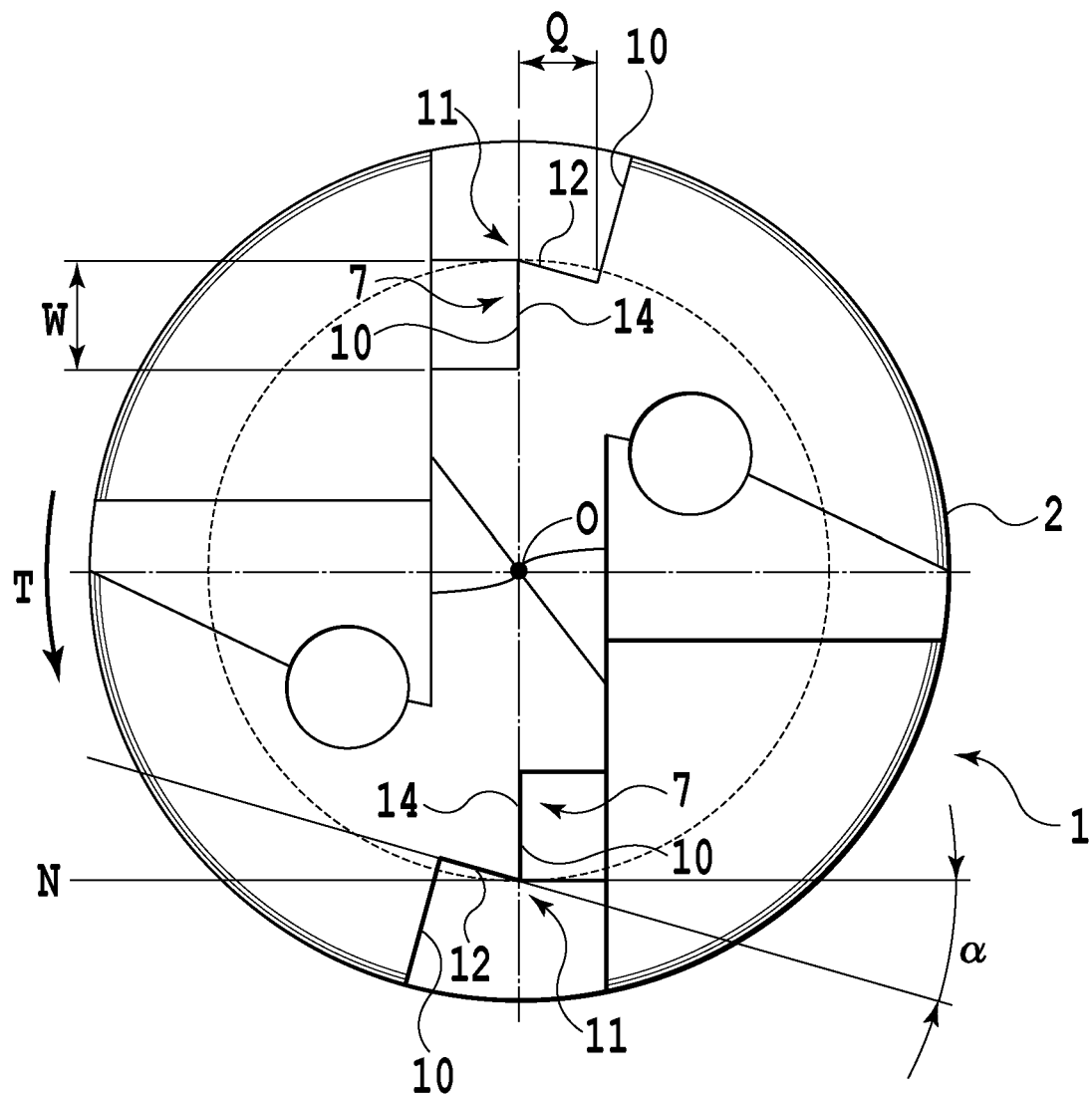
FIG. 5 is a side view illustrating the configuration of the step section of the drilling tool shown in FIG. 1.

As shown in FIG. 5, the step section 11 is composed of the turnup face 12 turned up from the rake face 10 and the rake face 10 intersecting with the turnup face 12. This turnup face 12 provides a level difference Q between the respective rake faces 10. The level difference Q of the step section 11 is, for example, 1.5 mm when being measured in the vertical direction to the rake face 10. This turnup face 12 is preferably inclined from the step section 11 in a direction away from the tool rotation direction T and to the inner side in the tool diameter direction with regard to the tangent line N drawn by the rotation trajectory circle (the circle shown by the chain line in FIG. 5) drawn by the corner section of the step section 11 at which the turnup face 12 intersects with the rake face 10. For example, the turnup face 12 has the inclination angle α of 15 degrees to the tangent line N. The two step sections 11 provided in one chip discharge groove 4 and two step sections 11 provided in another chip discharge groove 4, having the configuration as described above, are provided at 180-degree-rotationally-symmetrical positions to the axis line O.

Furthermore, as shown in FIG. 4, the cutting edges 14 are formed at the respective ridge lines at which the respective rake faces 10 intersect with the tip end flank face 16. The three neighboring cutting edges 14 are arranged discontinuously with an interval thereamong in the front-and-rear direction of the tool rotation direction T. The three cutting edges 14 provided in a step-like manner in the tool diameter direction constitute one cutting edge 15. One pair of cutting edges 15 is provided in a 180 degree-rotationally-symmetrical manner with respect to the axis line O to thereby constitute a drilling tool having two blades. These two cutting edges 15 are used to perform a drilling machining. The cutting edges 14 that are provided in a 180-degree-rotationally-symmetrical manner with respect to the axis line O are set to have substantially the same length. All of the cutting edges 14 have a substantially-equal length that is set so as to correspond to the width W of the sub-groove 7 in a range from 0.2 mm or more to 4.0 mm or less and preferably in a range from 0.4 mm or more to 2.0 mm or less and that is set to 0.6 mm for example.

The following will describe the operation of the drilling tool 1 having the configuration as described above according to this embodiment.

According to the drilling tool 1 in this embodiment, the two cutting edges 15 provided to surround the axis line O as a center in a 180-degree-rotationally-symmetrical manner are composed of the three cutting edges 14 that are discontinuously arranged to have an interval thereamong in the front-and-rear direction of the tool rotation direction T, respectively. Thus, the respective cutting edges 14 can be used to generate chips having a width corresponding to the length of the cutting edges 14. In other words, one cutting edge 15 is divided by two step sections 11 to thereby provide the three cutting edges 14. Thus, instead of generating one chip having a width corresponding to the length of the cutting edge 15, three chips are generated that have a width corresponding to the length of the cutting edge 14 having an about ⅓ length of that of the cutting edge 15. Chips having a narrow width obtained through segmenting as described above can be easily deformed to have a curled shape quickly, thus providing a shape of superior chip controllability. This consequently suppresses the situation where chips are sandwiched between the tool body 2 and a workpiece to cause a damage of the cutting part section for example. This can consequently improve the accuracy of the finish surface roughness of the workpiece or the dimension accuracy and can improve the tool life.

Furthermore, when the turnup face 12 of the step section 11 is inclined to have the predetermined angle α to the tangent line N of the rotation trajectory circle drawn by the corner of the step section 11 toward the rear side of the tool rotation direction T and toward the inner side of the tool diameter direction, the inner periphery end of the subsequent cutting edge 14 provided at an immediate rear side of the corner corresponding to the outer periphery end of the previous cutting edge 14 in the tool rotation direction T is not involved in the cutting operation (see FIG. 5). Thus, an eliminating the level difference Q as a result of that chips during cutting are partially welded to the inner periphery end of the subsequent cutting edge 14, and so on, is inhibited. Thus, chips can be securely segmented.

Furthermore, in contrast with a conventional nicked drill in which the groove width, position, or number of the nicks is undesirably limited due to the design, the drilling tool of the present invention allows the number of the sub-grooves 7 or the width W for example to be appropriately set depending on a required chip width. Thus, the respective cutting edges 14 can have a desired length without being limited due to a design reason. Thus, in contrast with a conventional nicked drill in which chips can be segmented to have a width merely reduced to about 4 mm, chips generated from the drilling tool 1 in this embodiment can be segmented to have a desired width and can have a further minute size. As a result, even when a deep hole having a complicated shape such as an engine block member (e.g., a cylinder block, a journal oil supply hole) is machined for example, the resultant chips can be easily discharged to the outside, thus preventing chips from remaining.

Furthermore, in contrast with a conventional nicked drill, no operation is required to repeatedly machine to form the nick whenever the cutting edge is grinded, thus providing a superior work efficiency.

Furthermore, the three cutting edges 14 constituting the cutting edge 15 and the three cutting edges 14 constituting another cutting edge 15 are mutually provided at rotationally-symmetrical positions to the axis line O. The cutting edges 14 provided at 180 degree-rotationally-symmetrical positions to the axis line O have substantially the same length. Thus, cutting resistance is applied to the respective cutting edges 14 in a balanced and uniform manner to thereby apply a uniform cutting force to the respective cutting edges 14 during cutting. As a result, the tool is rotated stably to thereby suppress vibration from occurring. Thus, the machining hole has an improved machining accuracy (e.g., hole position accuracy, hole diameter size, roundness, straightness, finish surface roughness).

All of the cutting edges 14 having substantially the same length means that chips generated through the respective cutting edges 14 have a uniform width or deformation. Thus, a part of the chips can be prevented from having a long length, thus allowing chips to be stably machined through the respective cutting edges 14.

In this case, the drilling tool 1 according to the present embodiment is formed so that the turnup section 8 of the sub-groove 7 is differently formed from the turnup section 5 of the chip discharge groove 4. Specifically, the turnup section 8 of the sub-groove 7 is formed to be gradually turned up in a direction substantially vertical to the inner face 9 facing to the front side in the tool rotation direction T of the sub-groove 7. Thus, when chips reach the turnup section 8 of the sub-groove 7, the chips will be pushed to the interior of the chip discharge groove 4. Thus, the drilling tool 1 has a superior chip discharge property by which the chipping due to sandwiched chips, a defective tool, or a damaged machining surface for example can be avoided. Thus, the tool life is extended and the machining accuracy is improved.

Figure 8:
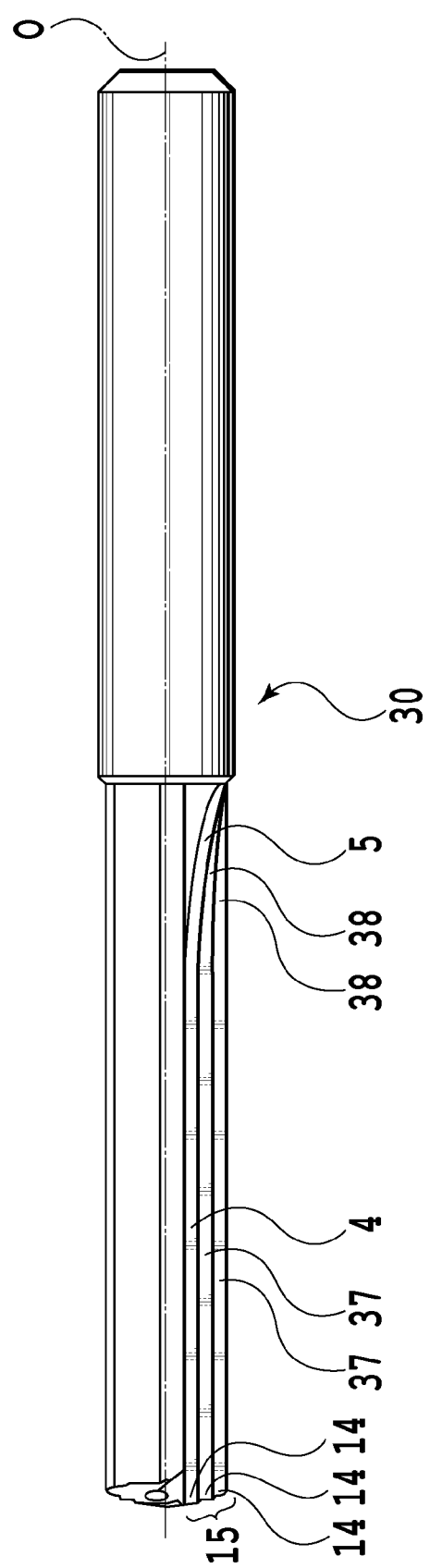
FIG. 8 is a front view illustrating a conventional drilling tool.

On the other hand, in the case of the conventional drilling tool 30 as shown in FIG. 8 in which the turnup section 38 of the sub-groove 37 is configured as in the turnup section 5 of the chip discharge groove 4 so as to be turned up from the center of the tool body 2 to the outer periphery side along the inner face 9 facing the front side in the tool rotation direction T and in a direction from the tip end side toward the rear end side, chips reaching the turnup section 38 of the sub-groove 37 are pushed toward the outer periphery side of the tool body 2 in the turnup section 38 of the sub-groove 37. This causes a possibility where chips may be sandwiched in a narrow space between the turnup section 38 of the sub-groove 37 positioned at the outermost side of the tool diameter direction and the workpiece.

Furthermore, the sub-groove 7 of the drilling tool 1 according to the present embodiment has the length L2 that is shorter than the length L1 of the chip discharge groove 4. Thus, when compared with the conventional drilling tool 30 including the sub-groove 37 having the same length as that of the chip discharge groove 4 (with reference to FIG. 8), the drilling tool 1 has an increased thickness at the rear end side of the tool body 2, thus providing a higher tool rigidity. Therefore, even when the cutting edge having the shape as described above is applied in a long tool such as a gun drill used for a deep hole machining, a sufficient tool rigidity is secured, thus suppressing chatter vibration or a broken tool.

Furthermore, the sub-groove 7 having the length L2 shorter than the length L1 of the chip discharge groove 4 reduces the time required to machine the sub-groove 7. This provides a shorter manufacture time of the drilling tool 1 when compared with the conventional drilling tool 30 having the sub-groove 37 having the same length as that of the chip discharge groove 4, thus reducing the manufacturing cost.

As described above, even when the sub-groove 7 has the length L2 shorter than the length L1 of the chip discharge groove 4, a space for discharging chips is sufficiently secured because the length L1 of the chip discharge groove 4 is set to be long as in the conventional design. Furthermore, chips reaching the turnup section 8 of the sub-groove 7 will be pushed along the turnup direction of the turnup section 8 in the sub-groove 7 toward the interior of the chip discharge groove 4. Thus, the drilling tool 1 can provide a superior chip discharge property.

Furthermore, the drilling tool 1 according to this embodiment has a web tapered structure in which the thickness of the web 3 is gradually increased from the tip end side of the tool body 2 to the rear end side, thus providing improved tool rigidity more than in the conventional case.

When the tool body 2 having a back tapered structure from the viewpoint of improving the tool rigidity has a web tapered structure as described above, the rear end side of the tool body 2 is prevented from having an increased cross-sectional area of the chip discharge groove 4, thus undesirably causing the chip discharge groove 4 to have a smaller cross-sectional area than that of the tip end side of the tool body 2. However, according to the drilling tool 1 of the present embodiment, the step-like cutting edges 14 can be used to segment chips with good chip controllability. Thus, even when the chip discharge groove 4 does not have a large cross-sectional area, chips can be prevented from clogging the rear end side of the tool body 2 or being sandwiched between the tool body 2 and the workpiece. Thus, the tool body 2 having a back tapered structure can have a web tapered structure, thus improving the tool rigidity.

Figure 9:
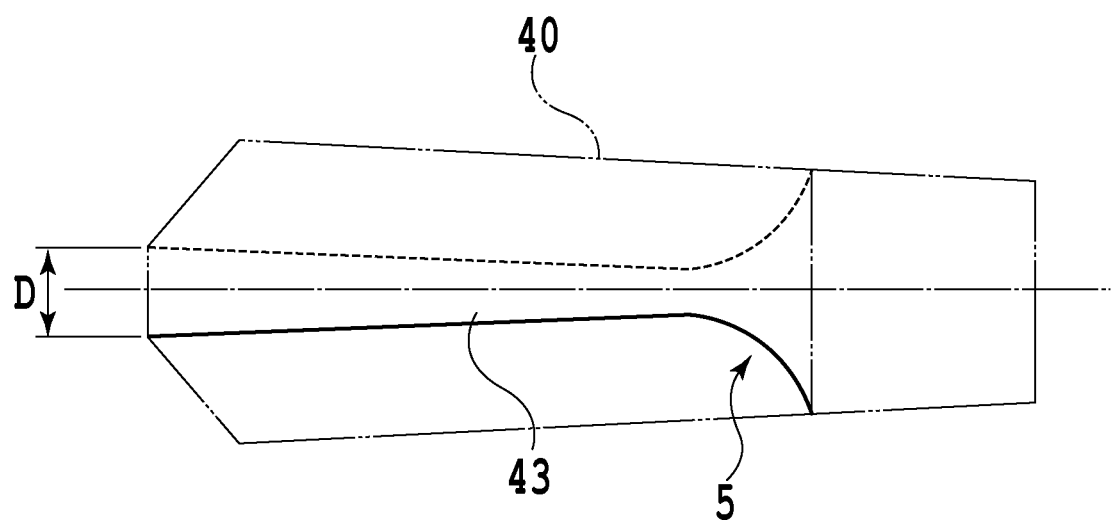
FIG. 9 is a schematic view illustrating the web of a conventional back taper drill.

On the other hand, in the case of the conventional back taper drill 40 as shown in FIG. 9, a chip discharge groove must have a certain level of a cross-sectional area in order to securely discharge chips. Thus, the web 43 is configured so that the web 43 is formed to correspond to the back taper to have a thickness decreased from the tip end side of the tool body 2 toward the rear end side. This means a possibility where an increased number of sub-grooves 37 causes a declined tool rigidity.

Figure 7:
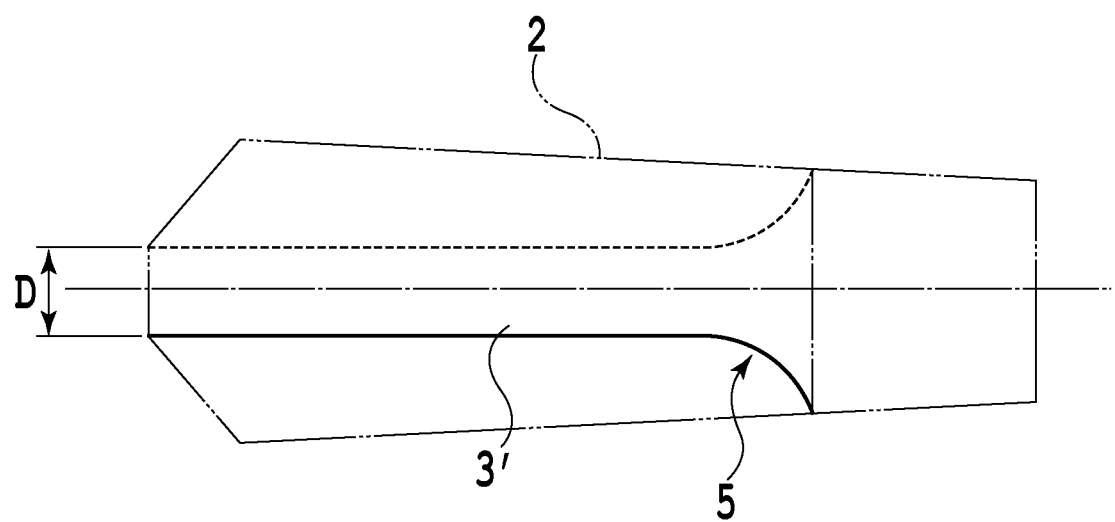
FIG. 7 illustrates a modification example showing the web of FIG. 6.

In the drilling tool 1 of the present embodiment, a web tapered structure was used in the tool body 2 in which the web 3 has a thickness increased from the tip end side toward the rear end side. However, another configuration as shown in FIG. 7 also may be used where the web 3' has substantially the same thickness that is substantially the same as the web thickness D over the entire length of the tool body 2. In this case, the tool rigidity is improved over the case of the conventional back taper drill 40 in which the web 43 has a thickness gradually decreased from the tip end side of the tool body 2 to the rear end side. Furthermore, the drilling tool of FIG. 7 provides a larger cross-sectional area of the chip discharge groove 4 than in the case of the drilling tool 1 in which the web 3 has a thickness increased from the tip end side of the tool body 2 toward the rear end side, thus providing a proportionally-improved chip discharge property.

Furthermore, in the drilling tool 1 according to the present embodiment, the number of the sub-grooves 7 is not particularly limited and can be set to an arbitrary number. In the case of the drilling tool 1 having the same diameter, an increase in the number of the sub-grooves 7 causes an increase in the number of the cutting edges 14, which causes the reduction in the length of one blade involved in a cutting operation. Thus, chips obtained through each cutting edge 14 have a reduced width. Specifically, chips are divided in the width direction in the number corresponding to the number of the sub-grooves 7. Thus, a higher number of sub-grooves 7 is preferred from the viewpoint of chip segmentation. For example, chips segmented to have a width of about 1 to 4 mm can be obtained by allowing one chip discharge groove 4 to include two to four sub-grooves 7 in the tool having a diameter of 12 mm and by allowing one chip discharge groove 4 to include three to five sub-grooves 7 in the tool having a diameter of 16 mm.

Furthermore, in the drilling tool 1 according to the present embodiment, the respective sub-grooves 7 have a substantially equal width W, the chip discharge groove 4 has a width in the tool diameter direction that is equally divided to three parts by two sub-grooves 7, and all of the cutting edges 14 have substantially the same length. However, another configuration also may be used, for example, in which the width W of the sub-groove is equally divided to four or more parts or the respective sub-grooves also may have different widths so that the respective cutting edges 14 can have an arbitrary length depending on an intended use or use conditions. The reduction of the width W of the sub-groove 7 causes an increase in the number of the sub-grooves 7 that can be formed in one chip discharge groove 4 causes an increase of the number of the cutting edges 14. Thus, the length of one blade is reduced. Thus, the sub-groove 7 having a narrower width W is preferred from the viewpoint of chip segmentation.

Figure 10:
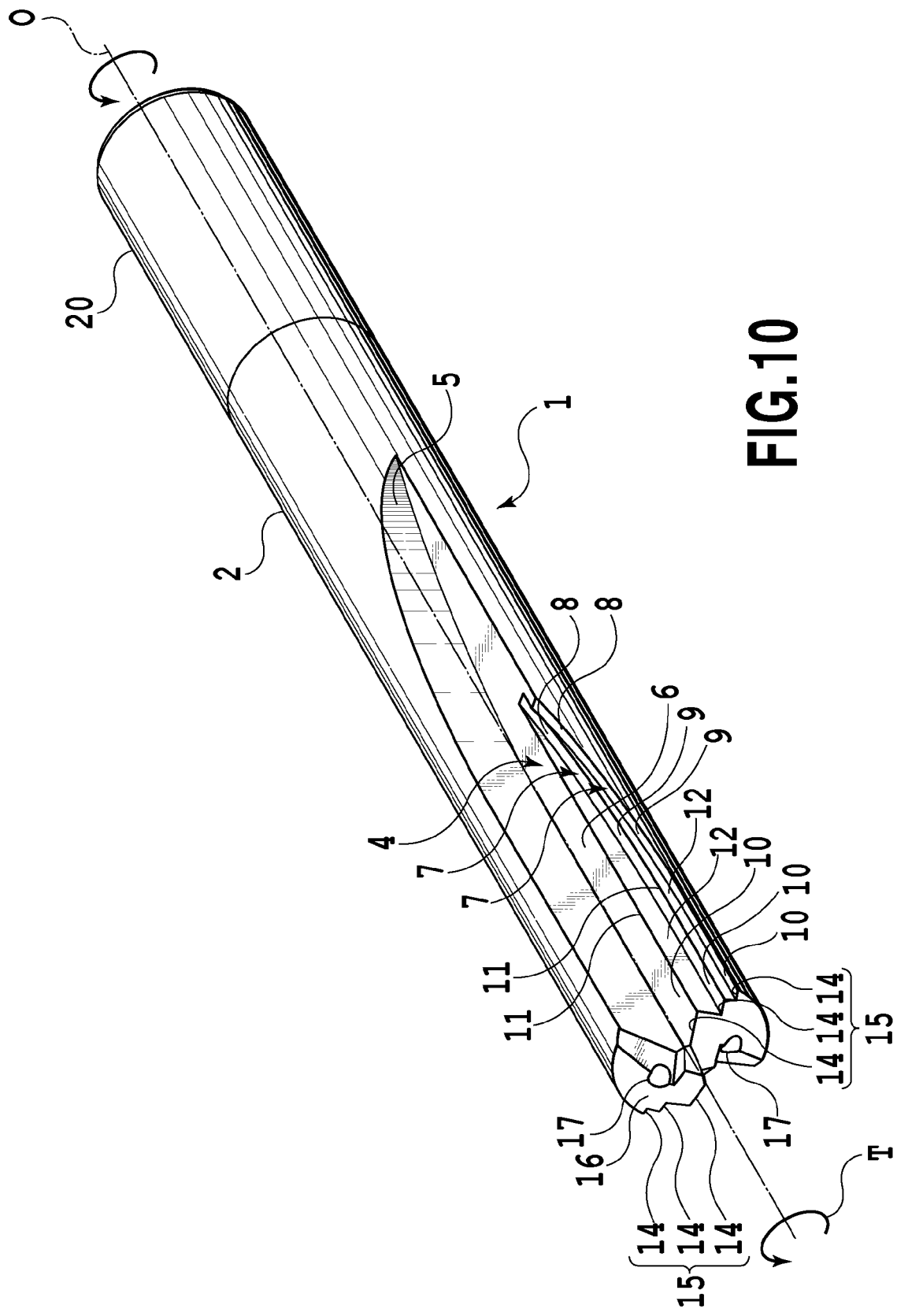
FIG. 10 is a perspective view illustrating a drilling tool according to another embodiment of the present invention, in which lengths of the sub-grooves become gradually shorter from the inner side in the tool diameter direction toward the outer side.
Figure 11:
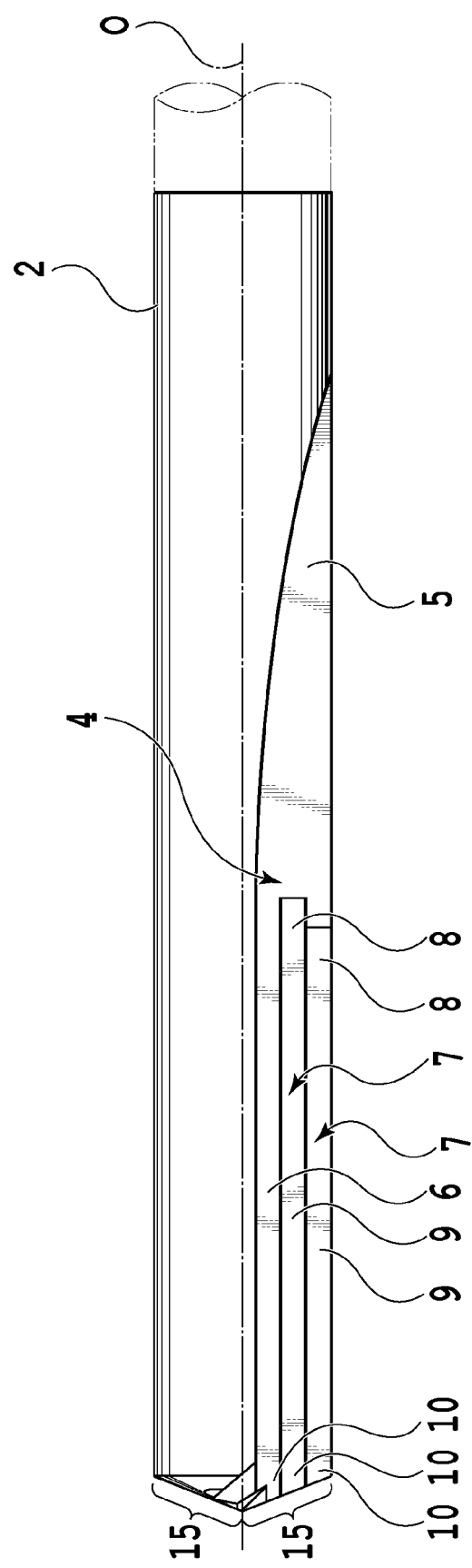
FIG. 11. is a plan view of the tool of FIG. 10.

Furthermore, the drilling tool 1 according to the present embodiment is configured so that all of the sub-grooves 7 have the same length L. However, as seen in FIGS. 10-11, another configuration also may be used in which the respective sub-grooves 7 adjacent to each other in one chip discharge groove 4 have lengths set to be gradually shorter from the inner side in the tool diameter direction toward the outer side. This configuration provides a further-improved tool rigidity.

Furthermore, the drilling tool 1 according to the present embodiment is configured so that the turnup section 8 of the sub-groove 7 is gradually turned up from the tip end side toward the rear end side in a direction substantially vertical to the inner face 9 facing the front side in the tool rotation direction T of the sub-groove 7. However, the turnup section 8 of the sub-groove 7 also can be turned up in a different direction other than the above direction. For example, the turnup section 8 of the sub-groove 7 also may be formed to be gradually turned up in a direction substantially vertical to the inner face 6 facing the front side in the tool rotation direction T of the chip discharge groove 4.

Furthermore, the drilling tool 1 according to the present embodiment is configured so that the step section 11 has the level difference Q of 0.5 mm and the turnup face 12 has the inclination angle α of 15 degrees. However, the drilling tool of the present invention also can be configured so that the level difference Q of the step section 11 and the inclination angle α of the turnup face 12 are not particularly limited and can be set to an arbitrary value. This step section 11 preferably has the level difference Q that is 0.5 mm or more and 2.0 mm or less and that is advantageously 0.25 mm or more and 1.0 mm or less. The reason is that the level difference Q smaller than 0.15 mm causes the level difference Q to be eliminated due to a weld deposit caused by a cutting operation, thus causing a situation where chips on the respective cutting edges 14 may be undesirably connected without being divided and thus chips having a wide width may be generated. Another reason is that the level difference Q larger than 2.0 mm may undesirably cause the tool body 2 to have a reduced cross-sectional area, thus deteriorating the tool rigidity.

The inclination angle α of the turnup face 12 is preferably 0°<α≤45° and is preferably 2.0°<α≤20°. When the turnup face 12 is inclined to the front side in the tool rotation direction T to the tangent line N of the rotation trajectory circle drawn by the corner of the step section 11 (i.e., when the angle α is negative), the inner periphery end of the subsequent cutting edge 14 is also subjected to a cutting operation. Thus, a situation may be caused where chips on the respective cutting edges 14 are connected without being divided and chips having a wide width are generated. When the angle formed by the rake face 10 and the turnup face 12 is 90 degrees and the inclination angle α of the turnup face 12 to the tangent line N is 0 degree, chips may be partially welded to the inner periphery end of the subsequent cutting edge 14, and so on, due to a cutting operation, causing a possibility where the chips at the respective cutting edges may be connected without being divided. The inclination angle α of the turnup face 12 exceeding 45 degrees causes a risk where the drilling tool of the present invention cannot maintain the strength at the ridge line at which the rake face 10 intersects with the turnup face.

Furthermore, the drilling tool 1 according to the present embodiment is a two-blade drill including the two cutting edges 15. However, the drilling tool of the present invention also may be one-blade drill or a three-blade drill. When the drilling tool of the present invention has three blades, the cutting edges 14 constituting the respective three cutting edges 15 are arranged to be 120-degree-rotationally-symmetrical (three way symmetrical) to the axis line O, thus allowing the tool to rotate stably. This consequently suppresses vibration from occurring, thus further improving the machining surface quality and the dimension accuracy for example.

Furthermore, a drilling tool has been illustratively described in order to describe the drilling tool of the present invention. However, the drilling tool of the present invention is not limited to this. The present invention also can be used for various drilling tools including general solid drill, blade drill, top solid drill, core drill, reamer, and boring cutter for example. Furthermore, the outer periphery of the tool body 2 also may include a margin from the viewpoint of improving the finish surface roughness or also may include a guide pad form the viewpoint of improving the guide property.

A typical embodiment of the present invention has been described as described above. However, the present embodiment can be subjected to various modifications and can be subjected to substitution or change so long as the substitution or change does not deviate from the intention and the scope of the present invention defined by the claims of this application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A drilling tool (1), comprising:
   a tool body (2) having an outer shape having a substantially cylindrical shape rotated around an axis line (O);
   a chip discharge groove (4) formed in an outer periphery of the tool body (2) to extend from a tip end face of the tool body (2) to a rear end side;
   at least one sub-groove (7) that is formed at an inner face (6) facing a front side in a tool rotation direction (T) of the chip discharge groove (4) and that is formed to extend from a tip end face of the tool body (2) to a rear end side;
   a rake face (10) formed at an inner face facing the front side in the tool rotation direction (T) of the chip discharge groove (4) and the at least one sub-groove (7), respectively;
   a tip end flank face (16) formed at a tip end face of the tool body (2); and
   a cutting edge (14) formed at a ridge line at which the tip end flank face (16) intersects with the rake face (10),
   wherein, the inner face facing the front side in the tool rotation direction (T) of the chip discharge groove (4) is formed to have a step-like shape having at least one step section (11) by the rake face (10), and
   a turnup section (8) at the rear end side of the sub-groove (7) is turned up in a different direction from the direction along which the turn up section (5) at the rear end side of the chip discharge groove (4) is turned up; and
   wherein, in a front end view of the drilling tool (1), the chip discharge groove's rake face (10) comprises a plurality of sections formed at different levels in the front-and-rear tool rotation direction (T).

2. The drilling tool (1) according to claim 1, wherein the turnup section (5) of the chip discharge groove (4) is gradually turned up along an inner face facing the front side in the tool rotation direction (T) from the tip end side toward the rear end side in a direction from the center side of the tool body (2) to the outer periphery side.

3. The drilling tool (1) according to claim 1, wherein the turnup section (8) of the sub-groove (7) is gradually turned up from the tip end side to the rear end side in a direction substantially vertical to the inner face facing the front side in the tool rotation direction (T) of the sub-groove (7).

4. The drilling tool (1) according to claim 1, wherein the sub-groove (7) has a shorter length than a length of the chip discharge groove (4).

5. The drilling tool (1) according to claim 1, wherein: the tool body (2) has a back tapered structure in which an outer diameter is gradually reduced from the tip end side to the rear end side and a web (3) at the rear end side of the tool body (2) has a thickness equal to or higher than a thickness of a web thickness at a front end side of the tool body (2).

6. The drilling tool (1) according to claim 5, wherein the tool body (2) has a web tapered structure in which the web (3) has a thickness gradually increased from the tip end side toward the rear end side.

7. The drilling tool (1) according to claim 5, wherein the web (3) has substantially the same thickness from the tip end side of the tool body (2) toward the rear end side.

8. The drilling tool (1) according to claim 1, wherein the tool body (2) has a turnup face (12) turned up from the rake face (10), and
   wherein the turnup face (12) is inclined from the step section (11), at which the turnup face (12) intersects with the rake face (10), in a direction away from the tool rotation direction (T) and to the inner side in the tool diameter direction with regard to a tangent line (N) drawn by a rotation trajectory circle drawn by a corner section of the step section (11).

9. The drilling tool (1) according to claim 1, wherein the turnup section (8) of the sub-groove (7) is positioned closer to the tip end than the turnup section (5) of the chip discharge groove (4).

10. The drilling tool (1) according to claim 1, comprising a plurality sub-grooves (7) adjacent to each other in the chip discharge groove (4), wherein the sub-grooves (7) have lengths set to be gradually shorter from the inner side in the tool diameter direction toward the outer side.

11. The drilling tool (1) according to claim 2, comprising a plurality sub-grooves (7) adjacent to each other in the chip discharge groove (4), wherein the sub-grooves (7) have lengths set to be gradually shorter from the inner side in the tool diameter direction toward the outer side.

12. The drilling tool (1) according to claim 3, comprising a plurality sub-grooves (7) adjacent to each other in the chip discharge groove (4), wherein the sub-grooves (7) have lengths set to be gradually shorter from the inner side in the tool diameter direction toward the outer side.

13. The drilling tool (1) according to claim 4, comprising a plurality sub-grooves (7) adjacent to each other in the chip discharge groove (4), wherein the sub-grooves (7) have lengths set to be gradually shorter from the inner side in the tool diameter direction toward the outer side.

14. The drilling tool (1) according to claim 5, comprising a plurality sub-grooves (7) adjacent to each other in the chip discharge groove (4), wherein the sub-grooves (7) have lengths set to be gradually shorter from the inner side in the tool diameter direction toward the outer side.

15. The drilling tool (1) according to claim 6, comprising a plurality sub-grooves (7) adjacent to each other in the chip discharge groove (4), wherein the sub-grooves (7) have lengths set to be gradually shorter from the inner side in the tool diameter direction toward the outer side.

16. The drilling tool (1) according to claim 7, comprising a plurality sub-grooves (7) adjacent to each other in the chip discharge groove (4), wherein the sub-grooves (7) have lengths set to be gradually shorter from the inner side in the tool diameter direction toward the outer side.

17. The drilling tool (1) according to claim 8, comprising a plurality sub-grooves (7) adjacent to each other in the chip discharge groove (4), wherein the sub-grooves (7) have lengths set to be gradually shorter from the inner side in the tool diameter direction toward the outer side.

18. The drilling tool (1) according to claim 9, comprising a plurality sub-grooves (7) adjacent to each other in the chip discharge groove (4), wherein the sub-grooves (7) have lengths set to be gradually shorter from the inner side in the tool diameter direction toward the outer side.

19. A drilling tool (1), comprising:
a tool body (2) having an outer shape having a substantially cylindrical shape rotated around an axis line (O);
a chip discharge groove (4) formed in an outer periphery of the tool body (2) to extend from a tip end face of the tool body (2) to a rear end side;
at least one sub-groove (7) that is formed at an inner face (6) facing a front side in a tool rotation direction (T) of the chip discharge groove (4) and that is formed to extend from a tip end face of the tool body (2) to a rear end side;
a rake face (10) formed at an inner face facing the front side in the tool rotation direction (T) of the chip discharge groove (4) and the at least one sub-groove (7), respectively;
a tip end flank face (16) formed at a tip end face of the tool body (2),
a cutting edge (14) formed at a ridge line at which the tip end flank face (16) intersects with the rake face (10),
wherein, the inner face facing the front side in the tool rotation direction (T) of the chip discharge groove (4) is formed to have a step-like shape having at least one step section (11) by the rake face (10),
a turnup section (8) at the rear end side of the sub-groove (7) is turned up in a different direction from the direction along which the turn up section (5) at the rear end side of the chip discharge groove (4) is turned up, and
wherein the turnup section (5) of the chip discharge groove (4) is gradually turned up along an inner face facing the front side in the tool rotation direction (T) from the tip end side toward the rear end side in a direction from the center side of the tool body (2) to the outer periphery side, and
wherein the turnup section (8) of the sub-groove (7) is gradually turned up from the tip end side to the rear end side in a direction substantially vertical to the inner face facing the front side in the tool rotation direction (T) of the sub-groove (7), and
wherein the sub-groove (7) has a shorter length than a length of the chip discharge groove (4),
wherein the tool body (2) has a back tapered structure in which an outer diameter is gradually reduced from the tip end side to the rear end side, and a web (3) at the rear end side of the tool body (2) has a thickness equal to or higher than a thickness of a web thickness at a front end side of the tool body (2); and
wherein, in a front end view of the drilling tool (1), the chip discharge groove's rake face (10) comprises a plurality of sections formed at different levels in the front-and-rear tool rotation direction (T).

20. A drilling tool (1), comprising:
a tool body (2) having an outer shape having a substantially cylindrical shape rotated around an axis line (O);
a chip discharge groove (4) formed in an outer periphery of the tool body (2) to extend from a tip end face of the tool body (2) to a rear end side;
at least one sub-groove (7) that is formed at an inner face (6) facing a front side in a tool rotation direction (T) of the chip discharge groove (4) and that is formed to extend from a tip end face of the tool body (2) to a rear end side;
a rake face (10) formed at an inner face facing the front side in the tool rotation direction (T) of the chip discharge groove (4) and the at least one sub-groove (7), respectively;
a tip end flank face (16) formed at a tip end face of the tool body (2),
a cutting edge (14) formed at a ridge line at which the tip end flank face (16) intersects with the rake face (10),
wherein, the inner face facing the front side in the tool rotation direction (T) of the chip discharge groove (4) is formed to have a step-like shape having at least one step section (11) by the rake face (10),
a turnup section (8) at the rear end side of the sub-groove (7) is turned up in a different direction from the direction along which the turn up section (5) at the rear end side of the chip discharge groove (4) is turned up, and wherein the turnup section (5) of the chip discharge groove (4) is gradually turned up along an inner face facing the front side in the tool rotation direction (T) from the tip end side toward the rear end side in a direction from the center side of the tool body (2) to the outer periphery side, and wherein the turnup section (8) of the sub-groove (7) is gradually turned up from the tip end side to the rear end side in a direction substantially vertical to the inner face facing the front side in the tool rotation direction (T) of the sub-groove (7), and wherein the sub-groove (7) has a shorter length than a length of the chip discharge groove (4), and wherein the tool body (2) has a back tapered structure in which an outer diameter is gradually reduced from the tip end side to the rear end side, and a web (3) at the rear end side of the tool body (2) has a thickness equal to or higher than a thickness of a web thickness at a front end side of the tool body (2), and wherein the tool body (2) has a web tapered structure in which the web (3) has a thickness gradually increased from the tip end side toward the rear end side.

21. A drilling tool (1), comprising:

a tool body (2) having an outer shape having a substantially cylindrical shape rotated around an axis line (O);

a chip discharge groove (4) formed in an outer periphery of the tool body (2) to extend from a tip end face of the tool body (2) to a rear end side;

at least one sub-groove (7) that is formed at an inner face (6) facing a front side in a tool rotation direction (T) of the chip discharge groove (4) and that is formed to extend from a tip end face of the tool body (2) to a rear end side;

a rake face (10) formed at an inner face facing the front side in the tool rotation direction (T) of the chip discharge groove (4) and the at least one sub-groove (7), respectively;

a tip end flank face (16) formed at a tip end face of the tool body (2), a cutting edge (14) formed at a ridge line at which the tip end flank face (16) intersects with the rake face (10), wherein, the inner face facing the front side in the tool rotation direction (T) of the chip discharge groove (4) is formed to have a step-like shape having at least one step section (11) by the rake face (10), a turnup section (8) at the rear end side of the sub-groove (7) is turned up in a different direction from the direction along which the turn up section (5) at the rear end side of the chip discharge groove (4) is turned up, and wherein the turnup section (5) of the chip discharge groove (4) is gradually turned up along an inner face facing the front side in the tool rotation direction (T) from the tip end side toward the rear end side in a direction from the center side of the tool body (2) to the outer periphery side, and wherein the turnup section (8) of the sub-groove (7) is gradually turned up from the tip end side to the rear end side in a direction substantially vertical to the inner face facing the front side in the tool rotation direction (T) of the sub-groove (7), and wherein the sub-groove (7) has a shorter length than a length of the chip discharge groove (4), and wherein the tool body (2) has a back tapered structure in which an outer diameter is gradually reduced from the tip end side to the rear end side, and a web (3) at the rear end side of the tool body (2) has a thickness equal to or higher than a thickness of a web thickness at a front end side of the tool body (2), and wherein the web (3) has substantially the same thickness from the tip end side of the tool body (2) toward the rear end side; and wherein, in a front end view of the drilling tool (1), the chip discharge groove's rake face (10) comprises a plurality of sections formed at different levels in the front-and-rear tool rotation direction (T).

* * * * *